US011834372B1

(12) United States Patent
El-Hassan et al.

(10) Patent No.: US 11,834,372 B1
(45) Date of Patent: Dec. 5, 2023

(54) TITANIUM BASED ORGANIC POLYMERS AND A METHOD OF MAKING AND USING SAME

(71) Applicant: United Arab Emirates University, Al Ain (AE)

(72) Inventors: Hilal El-Hassan, Al Ain (AE); Abdulkader El-Mir, Al Ain (AE); Amr El-Dieb, Al Ain (AE); Ahmed Alzamly, Al Ain (AE); Ashraf Aly Hassan, Al Ain (AE)

(73) Assignee: United Arab Emirates University, Al Ain (AE)

( * ) Notice: Subject to any disclaimer, the term of this patent is extended or adjusted under 35 U.S.C. 154(b) by 0 days.

(21) Appl. No.: 18/126,797

(22) Filed: Mar. 27, 2023

(51) Int. Cl.
*C04B 24/40* (2006.01)
*C04B 28/04* (2006.01)
*B01J 20/22* (2006.01)
*B01J 20/28* (2006.01)
*B01J 20/30* (2006.01)
*C07F 7/28* (2006.01)
*C04B 111/21* (2006.01)
*C04B 103/00* (2006.01)

(52) U.S. Cl.
CPC ........... *C04B 24/405* (2013.01); *B01J 20/226* (2013.01); *B01J 20/28066* (2013.01); *B01J 20/28071* (2013.01); *B01J 20/3085* (2013.01); *C04B 28/04* (2013.01); *C07F 7/28* (2013.01); *B01J 20/28004* (2013.01); *B01J 20/28016* (2013.01); *C04B 2103/0078* (2013.01); *C04B 2111/21* (2013.01)

(58) Field of Classification Search
CPC .................. C04B 24/405; C04B 28/04; C04B 2103/0078; C04B 2111/21; C04B 24/40; C04B 2111/20; C04B 2111/26; B01J 20/226; B01J 20/28066; B01J 20/28071; B01J 20/3085; B01J 20/28004; B01J 20/28016; C07F 7/28
See application file for complete search history.

(56) References Cited

FOREIGN PATENT DOCUMENTS

CN 115611578 A * 1/2023

OTHER PUBLICATIONS

CN-115611578-A, machine translation (Year: 2023).*
(Continued)

*Primary Examiner* — Anthony J Green
*Assistant Examiner* — Marites A Guino-O Uzzle
(74) *Attorney, Agent, or Firm* — Boyle Fredrickson, S.C.

(57) ABSTRACT

A process of manufacturing NH2-MIL-125(Ti) for use in mitigating ingress of chlorine ions in concrete, comprising dissolving 2-amino-benzene dicarboxylic acid in a 1:1 ratio of dimethylformamide and methanol, adding a titanium (IV) isopropoxide to the mixture at 150° C. with constant stirring to form NH2-MIL-125(Ti), submerging the NH2-MIL-125 (Ti) in dichloromethane for about 3 hours and separating the NH2-MIL-125(Ti). NH2-MIL-125(Ti) produced is activated and ready for use in cement-based concrete structures. NH2-MIL-125(Ti) is enabled to reduce the ingress of chlorine ions in concrete by at least 20%.

14 Claims, 4 Drawing Sheets

(56) References Cited

OTHER PUBLICATIONS

Yuan et al. Comparative effects of the pristine and amino-functionalized metal-organic frameworks on the mechanical properties and microstructures of cement pastes. Construction and Building Materials 347 (2022) 128544. DOI:10.1016/j.conbuildmat. 2022.128544 (Year: 2022).*

Lin et al. De novo synthesis of a MIL-125(Ti) carrier for thermal- and pH-responsive drug release, Biomaterials Advances 140 (2022) 213070. DOI:10.1016/j.bioadv.2022.213070 (Year: 2022).* www.chemsoon.com/product/1309760-94-8.html, Chemsoon.

Shen Hu et al., Solvothermal synthesis of NH2-MIL-125(Ti) from circular plate to octahedron, CrystEngComm, 2014, pp. 9645-9650, 16.

M. Ormellese et al., Corrosion inhibitors for chlorides induced corrosion in reinforced concrete structures, Cement and Concrete Research, 2006, pp. 536-547, 16.

Safaa El-Din H. Etaiw et al., Structure, characterization and inhibition activity of new metal-organic framework, Corrosion Science, Nov. 2011, pp. 3657-3665, vol. 53, Issue 11.

Ning Yuan et al., Comparative effects of the pristine and amino-functionalized metal-organic frameworks on the mechanical properties and microstructures of cement pastes, Construction and Building Materials, Sep. 12, 2022, 9 pages, vol. 347, 128544.

Yangyang Wang, et al., A novel high-efficient MOFs-based corrosion inhibitor for the reinforcing steel in cement extract, Construction and Building Materials, Jan. 24, 2022, 16 pages, vol. 317, 125946.

Ranwen Ou, et al., Thermoresponsive Amphoteric Metal-Organic Frameworks for Efficient and Reversible Adsorption of Multiple Salts from Water, Advanced Materials, 2018, 8 pages, vol. 30, Issue 34.

\* cited by examiner

TITANIUM BASED ORGANIC POLYMERS AND A METHOD OF MAKING AND USING SAME

TECHNICAL FIELD

The invention relates to the field of polymers comprising metal complexes. More specifically, the invention relates to an amine-functionalized form of the Titanium-incorporated metal-organic framework structure. The invention further relates to a method of making the framework structure and a method of using the framework.

BACKGROUND

In the construction and building materials industry, concrete and steel play a vital role in the building and maintenance of structures such as buildings, bridges, roads, etc., to name a few. Steel structures used for construction are surrounded/covered with concrete material. Steel structures absorb the tensile, shear, and at times compressive stresses in the concrete structure. Concrete, on the other hand, provides compression-related stresses. However, concrete has low tensile strength. Steel is b) decreases the exposure of steel to the external environment. Both concrete and steel are required for maintaining the structural integrity of the structure.

While concrete is pretty much inert to its surroundings, the same cannot be said about steel. Steel is prone to corrosion by a number of factors, including and not limited to oxygen and chlorine. Chlorine has little to minimum effect on concrete. Prolonged exposure to chlorine-containing liquid such as seawater, groundwater chlorine seepage, water from pools, the addition of calcium chloride as an additive, using salt to melt ice, etc., the chlorine ions seep into the concrete structure. Concrete is a porous structure. The moment the chlorine ions reach steel, it causes corrosion. Corrosion of steel becomes detrimental when the amount of chlorine ions in the steel reaches or goes beyond the threshold level. This leads to an irreversible deterioration and destruction of the steel.

Concrete, in general, provides an alkaline environment surrounding the steel. Accordingly, any seepage of chlorine ions will be neutralized by the concrete components. However, in time, the un-neutralized chlorine ions will continue their seepage towards steel and ultimately cause corrosion of the steel.

Different methods are employed in the prior art to mitigate the seepage of chlorine ions in concrete. Some of the methods include the addition of cellulose nanofibers, blast furnace slag, silica fume, and carboxylic-based corrosion inhibitors in concrete, spraying nitrate solution on the corroding concrete, etc.

There is a need for new and/or improved materials to incorporate into the concrete mixture, which will mitigate the ingress of Chlorine ions and, at the same time, does not decrease the structural integrity of the structure.

In this specification, any reference to the term "concrete" shall be interpreted sufficiently broadly to mean any type of aggregate material bonded together.

SUMMARY OF THE INVENTION

The inventors have developed a new method of manufacturing NH2-MIL-125(Ti) "MOF", which is capable of being used in cement-based concrete structures to reduce the ingress of chlorine ions in concrete structures. The invention further relates to manufacturing NH2-MIL-125(Ti) at low temperatures. The invention also relates to NH2-MIL-125(Ti) with improved characteristics to enable better adsorption of the chlorine ions. The invention also relates to NH2-MIL-125(Ti) with improved characteristics to enable better adsorption of the chlorine ions.

According to one aspect of the invention, there is provided a process of manufacturing NH2-MIL-125(Ti) for use in mitigating the ingress of chlorine ions in concrete comprising:

Dissolving 2 amino-benzene dicarboxylic acid in a 1:1 ratio of dimethylformamide and methanol to form a mixture, Adding titanium (IV) isopropoxide to the mixture to form NH2-MIL-125(Ti), Submerging the NH2-MIL-125(Ti) in dichloromethane and, Separating the NH2-MIL-125(Ti).

After the addition of titanium (IV) isopropoxide, the temperature of the mixture is maintained in the range of about 100° C. to about 200° C. The temperature may preferably be maintained at about 150° C.

The NH2-MIL-125(Ti) prepared is already activated and does not require any separate heat or chemical activation.

The NH2-MIL-125(Ti) has an average surface area of about 1530 m2/g.

The NH2-MIL-125(Ti) has an average pore volume of the compound is 0.35 g/cm3.

The NH2-MIL-125(Ti) has an average particle size of the particles is 0.1-0.5 microns.

The NH2-MIL-125(Ti) molecules are rhombic in shape.

According to another aspect of the invention, there is provided a process of manufacturing cement-based concrete structure capable of mitigating ingress of chlorine ions in concrete comprising mixing NH2-MIL-125(Ti) with a cement mixture constituting the cement-based concrete structure.

The NH2-MIL-125(Ti) is mixed with the cement mixture in the range of 1% to 5% of the cement mass. The concentration of the NH2-MIL-125(Ti) may preferably be maintained at about 5% of cement mass.

The MOF incorporating cement-based concrete structure is able to mitigate the ingress of chlorine ions by at least 20% compared to cement-based concrete structures lacking the compound.

The MOF incorporating cement-based concrete structure is able to decrease the penetration depth of chlorine ions in concrete structure by at least 17% compared to cement-based concrete structures lacking the compound.

The MOF incorporating cement based concrete structure has limited impact on the compressive strength response of the cement-based concrete structure. More specifically, the compressive strength response of the cement-based concrete structure incorporating the MOF is at least 91% compared to cement-based concrete structures lacking the MOF.

BRIEF DESCRIPTION OF THE DRAWINGS

Further features of the invention are described hereinafter by way of a non-limiting example of the invention, with reference to and as illustrated in the accompanying diagrammatic drawing. In the drawings.

DETAILED DESCRIPTION OF THE INVENTION

Figure 1:
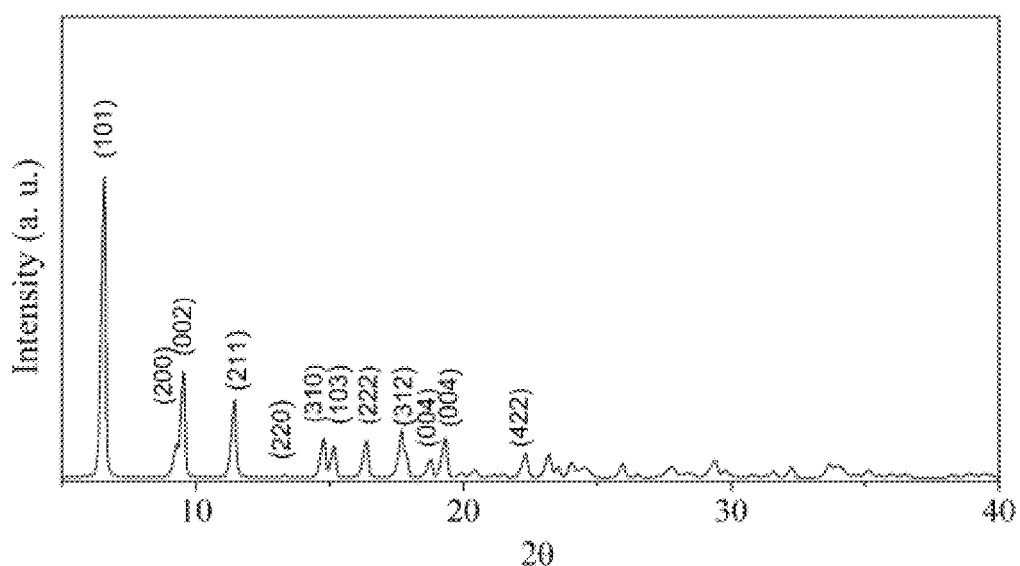
FIG. 1 shows a graph showing the Powder X-ray diffraction pattern of synthesized NH2-MIL-125(Ti)

The invention relates to a method of manufacturing a metal-organic framework capable of mitigating chloride ingress in the concrete structure. More specifically, the metal-organic framework relates to NH2-MIL-125(Ti).

Metal-organic frameworks (MOF), also known as porous coordination polymers, belong to a category of crystalline porous solid materials comprising organic linkers and metal clusters/ions. The use of MOF in the present disclosure is particularly advantageous owing to its crystalline nature, adjustable pore size, and structural diversity. Given their unique properties and the controllability of their composition and structure, MOF have been found by the inventors to be particularly advantageous. The critical advantage of the MOF mainly relies on the possibility of tailoring the properties and structure of targeted MOF by a selection of metal linkers to the MOF's organic and inorganic counterparts. The particle size distribution of MOF affects the workability, mechanical properties, and hydration products of cement-based composites. Hence, the controllability and diversity in producing MOF possess great potential. Further, it is known that a slight change in the solvent conditions drastically changes the shape and, in turn, surface area, adsorption properties, etc., to name a few.

The inventors have advantageously found, in accordance with the invention, a method of manufacturing NH2-MIL-125(Ti), which is capable of mitigating the ingress of chloride ions in concrete.

Method of Manufacturing NH2-MIL-125(Ti)

Starting Materials:

The starting materials include 2-amino-benzene dicarboxylic acid ($C_8H_7NO_4$), dimethylformamide (DMF), methanol, titanium (IV) isopropoxide ($C_{12}H_{28}O_4Ti$), and dichloromethane (DCM)

Method:

The process involves dissolving a known quantity of amino-aromatic carboxylic acid in a suspension of dimethylformamide and methanol. To this suspension, a metal oxide is added. This mixture is stirred for a day while maintaining the temperature at 150° C. A precipitate is obtained. The precipitate is separated from the mixture and is washed to remove the starting materials. The precipitate obtained is placed in dichloromethane to exchange the solvent. The precipitate is then dried to remove any traces of dichloromethane. The final dried precipitate is ready for use in concrete structures.

Using the above method of the invention, several catalysts were prepared. An example of a method of preparation of the catalyst in accordance with the invention is provided below.

Example 1—Preparing NH2-MIL-125(Ti)

To prepare NH2-MIL-125(Ti), 6 mmol of 2 amino-benzene dicarboxylic acid ($C_8H_7NO_4$) was dissolved in a mixture of dimethylformamide (DMF) and methanol. Using different concentrations and rations of dimethylformamide (DMF) and methanol, different types of NH2-MIL-125(Ti) may be obtained. In a preferred embodiment, the ratio of dimethylformamide (DMF) and methanol is maintained as 1:1.

In a preferred embodiment, the 6 mmol of 2 amino-benzene dicarboxylic acid ($C_8H_7NO_4$) was dissolved in a mixture of 50 mL dimethylformamide (DMF) and 50 mL of methanol.

This mixture was transferred to a sealed tube. Transfer of the mixture to a sealed tube is important so as to avoid exposure of the mixture to air and create pressure on the reaction mixture.

To this mixture, 3 mmol of titanium (IV) isopropoxide ($C_{12}H_{28}O_4Ti$) was added. This mixture was maintained from about 100° C. to about 200° C. without continuous stirring for about 24 hours. More preferably, the temperature of the mixture is maintained at about 150° C. Non-limiting examples of the heating mechanism or heat maintenance mechanism include and are not limited to a heating jacket enclosing the tube, an electric tube furnace, conducting the mixing in an enclosed heating chamber, by incorporating electric coils or a jacket within or outside the tube.

Non-limiting examples of the stirring mechanism include and are not limited to a laboratory stirrer, magnetic stirrer, biological stirrer, or a moving or vibrating stirrer table for placing the sealed tube.

In yet another embodiment, the stirrer mechanism may be equipped with a temperature-maintaining mechanism.

While stirring the tube at 150° C., a yellow precipitate begins to form. It is observed that after 24 hours of stirring, the reaction is completed, and no further precipitate occurs.

After 24 hours, the yellow precipitate is separated from the mixture. Any means for separation may be used, such as centrifugation, filtration, or evaporation. Preferably, the precipitate is separated from the mixture via vacuum filtration.

It is observed that the precipitate will still have traces of the starting materials, i.e., 2 amino-benzene dicarboxylic acid. To remove the starting material, the precipitate was washed with DMF and methanol.

The precipitate was then placed in dichloromethane (DCM) for about 3 hours for the exchange of solvent. The precipitate was then separated.

The precipitate was then dried in a vacuum oven at about 100° C.

The final product obtained is NH2-MIL-125(Ti).

This product is activated and is capable of being directly used with concrete. It is noted that, unlike other known metal-organic framework molecules, no separate high-temperature activation of the molecules of the invention are required. Without being bound to by a specific theory, the inventors believe that by exposing the precipitate to DCM for 3 hours, the NH2-MIL-125(Ti) is automatically reduced and is capable of being used with concrete.

The step of drying the final product in a vacuum is an optional step. Drying the product enables ease of its use, easy storage, and increased shelf life.

Characterization of NH2-MIL-125(Ti)

The crystalline structure of NH2-MIL-125(Ti) was determined by powder X-ray diffraction, as shown in FIG. 1. The atomic and weight percentages of NH2-MIL-125(Ti) are summarized in Table 1.

TABLE 1

Atomic and weight percentages of NH2-MIL-125(Ti)

| Element | Weight, % | Atom, % |
| --- | --- | --- |
| C | 22.78 | 39 |
| O | 25.83 | 33.19 |
| N | 5.54 | 8.13 |
| Ti | 45.86 | 19.68 |

The morphology of the NH2-MIL-125(Ti) plays an important role in its role in adsorption of chlorine ions. Concrete, in general, is porous in nature. The particle size, pore size, and pore volume of the NH2-MIL-125(Ti) are so managed so as to ensure that the NH2-MIL-125(Ti) molecules fit inside the porous structure of the concrete. When the concrete containing NH2-MIL-125(Ti) is subjected to an environment with chlorine, as the chlorine ions seep into the pores of the concrete, it is met with the NH2-MIL-125(Ti) molecules. The NH2-MIL-125(Ti) molecules adsorb the chlorine molecules and prevent or reduce further ingress of the chlorine molecule within the concrete structure.

Figure 2:
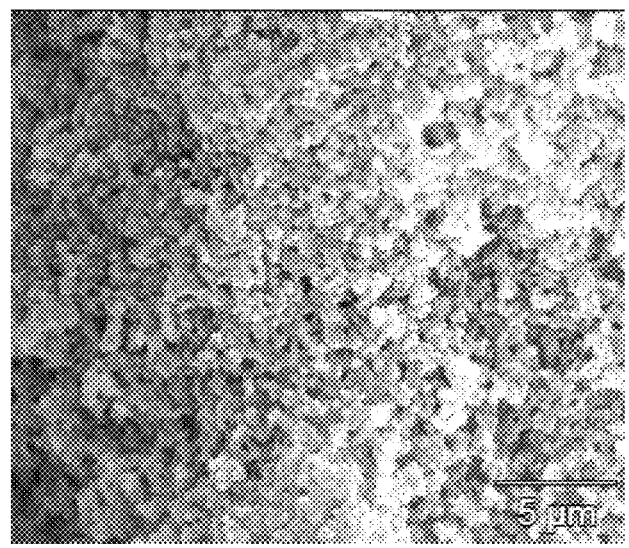
FIG. 2 shows the SEM image of NH2-MIL-125(Ti)

The synthesized NH2-MIL-125(Ti) surface morphology was examined through SEM image analysis and is presented in FIG. 2. The SEM images revealed a uniform agglomerate of rhombic shapes. The specific surface area of NH2-MIL-125(Ti) was 1530 m2/g. The pore volume of the compound was found to be in the region of 0.35 g/cm3. The particle size of the particles was found to be in the region of 0.1-0.5 microns.

Figure 3:
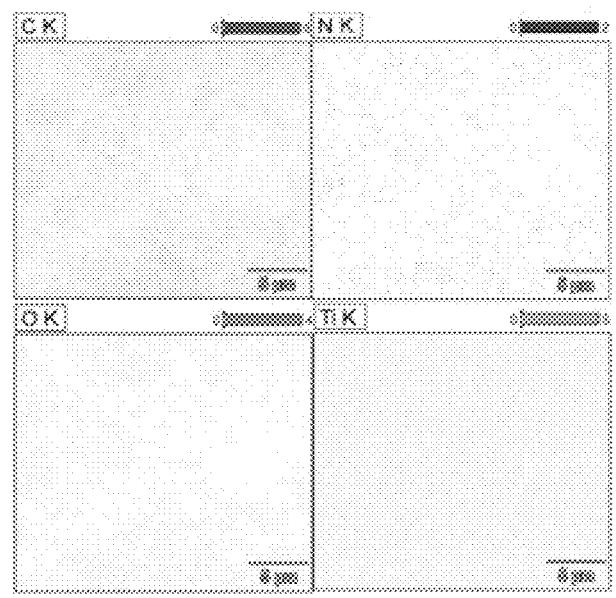
FIG. 3 shows the EDX mapping image of NH2-MIL-125(Ti)

Further, the EDX element mapping of NH2-MIL-125(Ti) was carried out. The results of which are shown in FIG. 3.

Preparing Cement-Based Concrete Structure

The cement-based concrete samples were prepared using the MOF of the invention. In the cement-based concrete mixture, the inventors used ordinary Portland cement, dolomitic limestone crushed coarse aggregates. In a preferred embodiment, the mixture consists of cement and limestone mixtures in a maximum size of 10 mm and is a well-graded fine aggregate.

It is to be noted that the MOF of the invention is capable of being used with any concrete mixtures and is not limited to the cement and limestone types and sizes mentioned above. The NH2-MIL-125(Ti) was used as a chloride ion adsorbent in the concrete matrix.

For preparing the concrete mixture, the cement and water content was maintained at around 325 kg/m$^3$ and 208 kg/m$^3$ respectively. Mixtures with different proportions of the MOF of the invention were prepared.

For the purpose of illustrating the invention, separate mixtures were prepared by adding 1%, 3%, and 5% MOF of the invention into cement mixtures. A plain cement mixture (without any MOF added) was used as a control.

The mixing protocol consisted of homogenizing the dry components, comprising cement, coarse aggregates, and sand, in a concrete mixer. It is observed that 3 minutes is sufficient to obtain an even mix of the dry components.

Water is then gradually added to the mixture dry components. The solution of water and the dry components is mixed.

Mixing may be carried out in any of the two ways. a) The mixture of the dry components is mixed while adding water, or b) the mixture of the dry components is held static and is mixed only once all the water is added.

Mixing the components while adding water is preferred as it enables the lesser formation of clumps, and the time required for mixing is also reduced. It is noticed that in this case, uniform mixing is obtained within 2 minutes once complete water is added.

Once uniform mixing was attained, MOF was added to the wet mixture. It is observed that in one minute of adding the mixture, uniform distribution of MOF is obtained.

It is noted that although a minute is sufficient to obtain uniform distribution of the MOF in the wet mixture, a person skilled in the art may increase or reduce this time depending on the speed of mixing, the size of mixture particles, any stirrers involved, etc.

The mixture with MOF was then cast into steel molds. These molds were covered to prevent water evaporation. A different mechanism may be used to prevent water evaporation of the casted concrete. A few non-limiting examples include covering the molds with plastic, covering the molds with cloth material, and maintaining such cloth wet (by pouring additional water thereon) while casting.

Once the molds were dry, the specimens were demolded and water-cured for 7 days. It is observed that the molds are dry in about 24 hours. However, it is to be noted that if the molds do not seem dried in about 24 hours, more time may be allotted for sufficient drying.

Composition of Concrete Mixtures

The mixture proportions of the produced concrete mixes are summarised in Table 2.

TABLE 2

Mixture proportions (Kg/m$^3$) of concrete with different addition rates of MOF.

| Component | M0 (control) | M1 | M3 | M5 |
| --- | --- | --- | --- | --- |
| Cement | 325 | 325 | 325 | 325 |
| Coarse Aggregates | 835 | 830 | 822 | 813 |
| Sand | 964 | 958 | 949 | 939 |
| Water | 208 | 208 | 208 | 208 |
| MOF | 0.00 | 3.25 | 9.75 | 16.25 |

Adsorption of Chloride Ions

The MOF was added to the concrete mixture to specifically mitigate the ingress of chloride ions in the concrete structures. The MOF is capable of performing such action by adsorbing the chloride ions or by chemically reacting with the incoming chloride ions, thereby mitigating its ingress.

It is to be noted that the above-mentioned actions are non-limiting examples of how the MOF of the invention is capable of mitigating the ingress of the chloride ions.

Assessment of Chloride Adsorption Capacity of the NH2-MIL-125(Ti) (MOF)

The chloride adsorption capacity of the MOF was assessed by immersing the MOF in its powder form in a solution containing sodium chloride. The concentration of sodium chloride is maintained at 5%.

For assessing the adsorption capacity of the MOF, the concentration of the chloride in the solution was continuously measured for up to 52 days. The reduction in the concentration of the chloride solution was calculated as the chloride adsorption capacity of the MOF.

Figure 4:
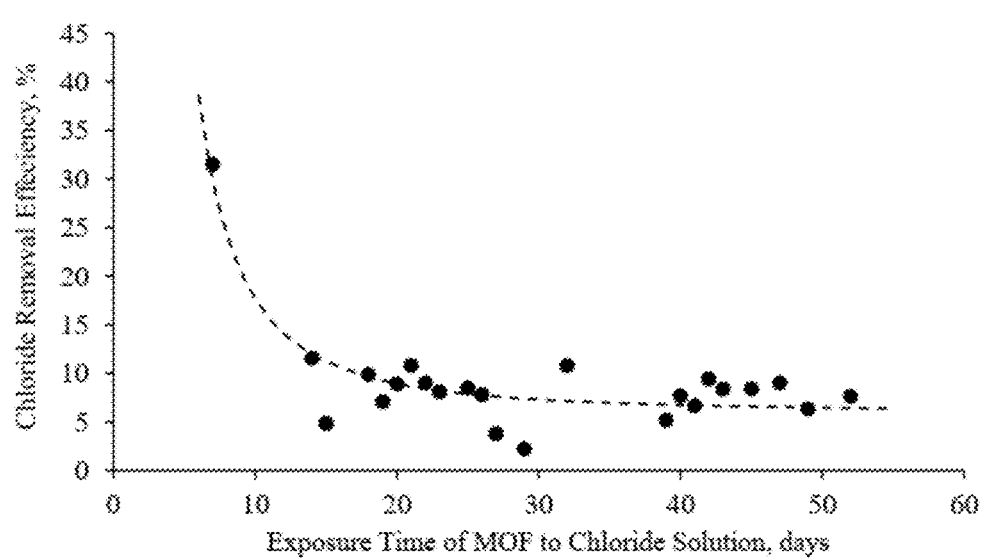
FIG. 4 shows a graph showing the relationship between the exposure time of NH2-MIL-125(Ti) to sodium chloride solution and chloride removal efficiency.

The chloride ion removal efficiency of the MOF was obtained by measuring the concentration of sodium chloride solution at different time intervals, as shown in FIG. 4. It can be seen that the chloride ion removal efficiency exhibited the highest response of 31.5% in 7 days. The efficiency then decreased to 11.6% at 14 days. Moreover, the removal efficiency continued to decrease up to 7.8% at 26 days, after which it stabilized in the vicinity of 7.5%. This indicates that the MOF has a continuous removal capacity of chloride ions. It is noted that the after about 26 days, the action of the MOF remains constant. It can be concluded that the adsorption capacity is dependent on the exposure time to the chloride solution.

Assessment of Chloride Adsorption Capacity of the NH2-MIL-125(Ti) (MOF) in Concrete The chloride penetration in concrete was determined on 50 mm concrete cubes following the immersion test of NT Build 443.

The specimens were immersed in a sodium chloride solution having a concentration of 165 g NaCl per liter for up to 5 months. The chloride penetration depth (xd) was recorded at specific intervals after immersion in about 1, 2, 3, and 5 months. The sodium chloride solution was replaced every week so as to maintain a steady concentration of the chloride ions in the solution.

For evaluation, upon completion of the corresponding interval of time, a concrete block was removed from the sodium chloride solution. This block was cut into sections. A silver nitrate solution (0.1 M) was sprayed onto the freshly cut section of the concrete cube to measure the penetration depth of chloride ions, as per NT Build 492.

The chloride penetration depth was used to quantify the ingress of chloride ions into the concrete samples.

Figure 5:
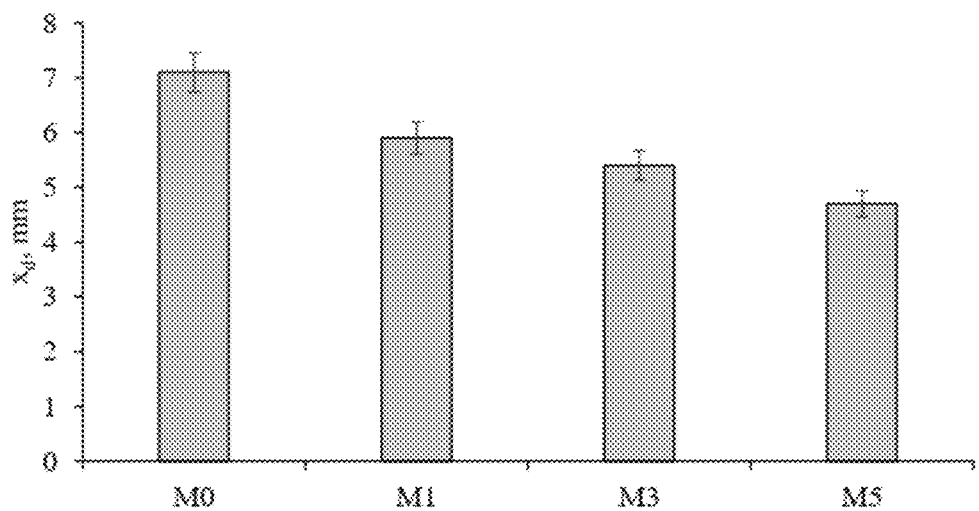
FIG. 5 shows a graph showing the effect of adding NH2-MIL-125(Ti) on the chloride ions penetration depth after immersion in sodium chloride solution for 1 month.

FIG. 5 depicts the chloride ions penetration depths in mm for concrete mixes after 1 month of immersion in NaCl solution. It can be seen that an increase in the MOF content in the concrete mixes reduced the chloride penetration depths for each of the concrete blocks. In the control concrete block M0, the concrete penetration depth was observed as 7.1 mm. For the concrete blocks with MOF, the chloride penetration depth decreased from 7.1 mm to 5.9 mm for M1, from 7.1 mm to 5.4 mm for M3, and from 7.1 mm to 4.7 mm for M5.

It can therefore be concluded that the incorporation of 1, 3, and 5% MOF of cement mass in concrete mixes decreased the penetration depth by 17% for M1, 24% for M3, and 34% for M5, as compared to the plain concrete mix, M0.

It is seen that the drop in the penetration depth is directly linked to the addition of the MOF to the concrete mix. The results provide evidence of the ability of MOF of the invention to adsorb chloride ions and enhance the resistance against the penetration of chlorides into the concrete mix while highlighting the fact that higher MOF quantity led to lower chloride ingress.

Figure 6:
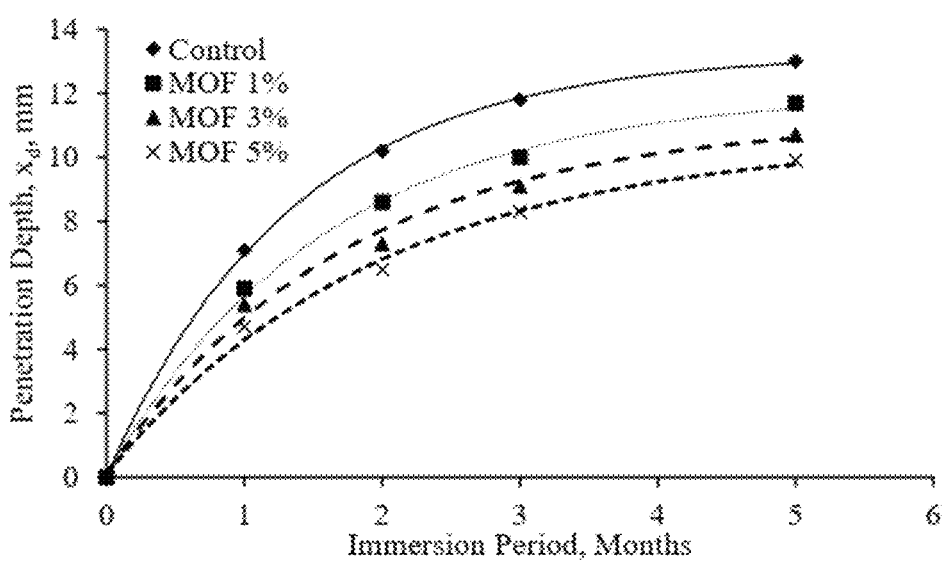
FIG. 6 shows a graph showing the effect of adding NH2-MIL-125(Ti) on the variation of penetration depth over time.

FIG. 6 illustrates the development or ingress in the chloride penetration depth of concrete over time. As seen in FIG. 6, while the penetration depth of the chloride ions increased over time, the rate of increase was found to be dependent on the amount of MOF incorporated into the concrete mix. It is observed that as more MOF was incorporated into the concrete mix, the penetration rate of the chloride ions decreased, as evidenced by the reduction in the slope of the best-fit curve.

Furthermore, the addition of MOF led to lower penetration depths at different time periods. The penetration depths at 2, 3, and 5 months of exposure to sodium chloride solution decreased by up to 36, 30, and 24%, respectively, upon incorporating up to 5% MOF, by cement mass, into the concrete mix. Yet, among the mixes having different MOF quantities, those incorporating the highest percentage MOF (i.e., 5%, by cement mass) experienced a superior reduction in chloride penetration depth. Such a finding indicates that chloride ingress mitigation ability is proportional to the quantity of NH2-MIL-125(Ti) MOF added to the concrete mix.

Figure 7:
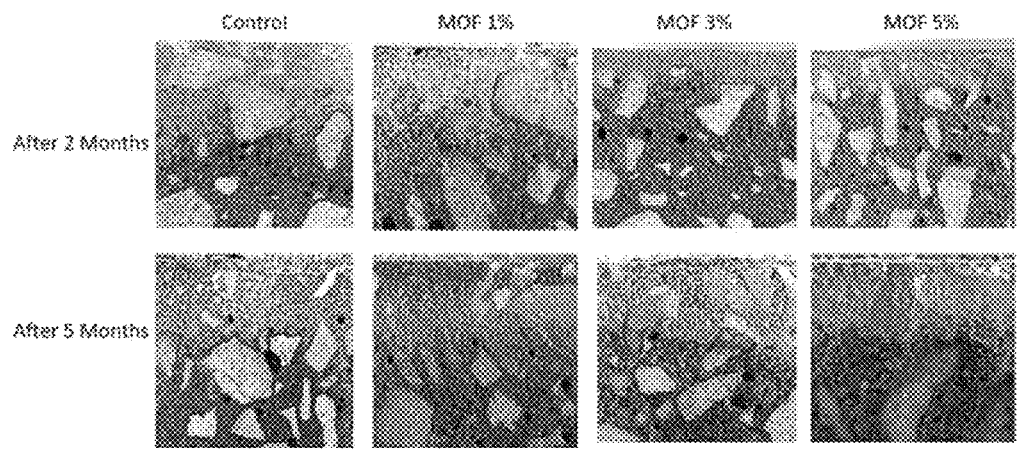
FIG. 7 shows photos of the chloride penetration depth of different concrete mixes.

FIG. 7 discusses the chloride penetration depth of different concrete samples after spraying the freshly cut concrete specimen surface with silver nitrate solution. The grey-white color indicates the penetration of the chloride ions into the concrete structure.

The compressive strength was determined on 50-mm cubes to evaluate the mechanical performance of concrete containing MOF. Concrete cubes were tested in triplicates, as per BSEN-12390-3, to obtain an average.

Figure 8:
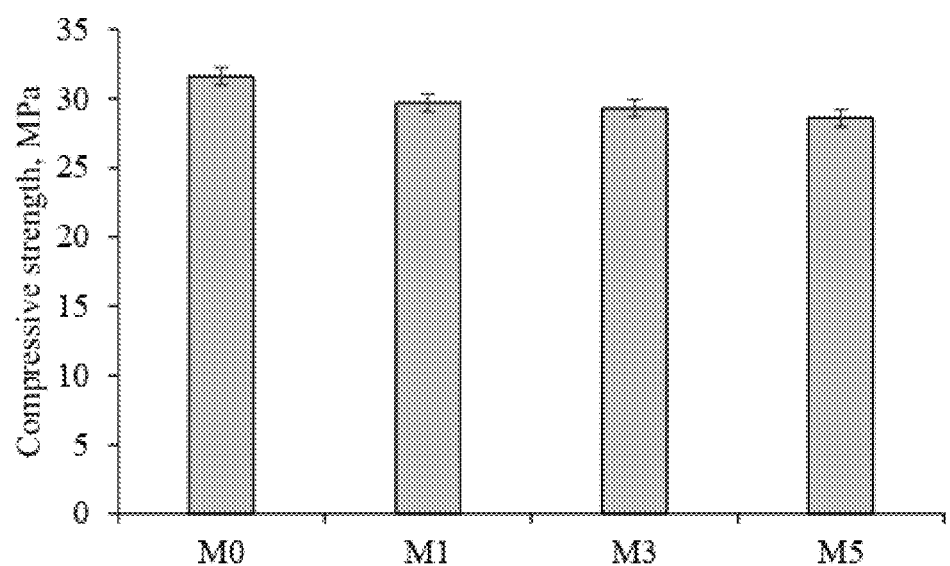
FIG. 8 shows a graph showing the compressive strength of concrete having different content of NH2-MIL-125(Ti).

The effect of adding NH2-MIL-125(Ti) MOF on the concrete compressive strength is shown in FIG. 8. The graph shows that incorporating MOF into the concrete mix had a limited impact on the compressive strength response. It is observed that the compressive strength slightly decreased from 31.6 MPa for the control mixture to 29.7, 29.3, and 28.6 MPa when 1, 3, and 5% MOF were added to the concrete mix, respectively. These values represent 6, 7, and 9% decreases in the compressive strength compared to the control mix.

The results reflect the feasibility of incorporating MOF in cement-based concrete to improve the resistance against chloride ingress while having a limited effect on the compressive strength.

Advantages of using MOF of the invention with concrete

MOF is a highly versatile compound. Due to its non-reactiveness with concrete, MOF is seen to find its use in cement-based concrete without affecting the chemistry or physical nature of concrete. It can therefore be effectively applied in the construction and building material industry.

MOF is found to be capable of reducing the concentration of chlorine in a solution as well as in concrete by any means, such as adsorption or chemical interaction. It, therefore, presents an opportunity to be able to mix with concrete to mitigate the ingress of chloride ions in concrete.

The use of MOF in cement-based concrete can alleviate the detrimental impact of Chloride ingress on concrete structures. This will thereby increase the shelf life of concrete structures. This will, in turn, increase the maintenance time frame of the concrete structures and thereby reducing the costs.

The use of MOF in cement-based concrete has a limited impact on the compression properties of concrete.

It will be understood that the above embodiment descriptions are given by way of example only and that various modifications may be made by those skilled in the art. Although various embodiments have been described above with a certain degree of particularity or with reference to one or more individual embodiments, those skilled in the art could make numerous alterations to the disclosed embodiments without departing from the scope of this invention. It is to be understood that any feature described in relation to one example may be used alone or in combination with other features described and may also be used in combination with any features of any other of the examples or any combination of any other examples.

What is claimed is:

1. A method of making a cement-based concrete structure capable of mitigating ingress of chlorine ions, the method comprising:
   providing cement;
   providing NH2-MIL-125(Ti);
   providing water;
   providing aggregates
   mixing the NH2-MIL-125(Ti) with the cement, the aggregates and water;

allowing the mixture of the NH2-MIL-125(Ti), the aggregates and the cement to set, thereby to form the cement-based concrete structure and wherein an average pore volume of the NH2-MIL-125(Ti) is 0.35 g/cm$^3$".

2. The method as claimed in claim 1, wherein when mixing, the NH2-MIL-125(Ti) is mixed with the cement and the aggregates, so as to maintain the NH2-MIL-125(Ti) concentration in the mixture in the range of between 1% to 5% by cement mass.

3. The method as claimed in claim 1, wherein when mixing, the NH2-MIL-125(Ti) is mixed with the cement and the aggregates, so as to maintain a NH2-MIL-125(Ti) concentration in the cement-based concrete mixture of about 5% by cement mass.

4. The method of claim 1, wherein the cement-based concrete structure formed by the method is able to mitigate the ingress of chlorine ions by at least 20% compared to cement-based concrete structures lacking the NH2-MIL-125 (Ti).

5. The method of claim 1, wherein the cement-based concrete structure formed by the method, is able to decrease the penetration depth of chlorine ions in concrete structure by at least 17% compared to cement-based concrete structures lacking the NH2-MIL-125(Ti).

6. The method of claim 1, wherein the addition of NH2-MIL-125(Ti) to the cement and the aggregates, has limited impact on the compressive strength response of the cement-based concrete structure.

7. The method of claim 1, wherein the compressive strength response of the cement-based concrete structure is at least 91% compared to cement-based concrete structures lacking the NH2-MIL-125(Ti).

8. The method of claim 1, wherein an average surface area of a NH2-MIL-125(Ti) molecule is about 1530 m$^2$/g.

9. The method of claim 1, wherein an average particle size of the NH2-MIL-125(Ti) is 0.1-0.5 microns.

10. The method as claimed in claim 1, wherein providing NH2-MIL-125(Ti) comprises:
    dissolving 2 amino-benzene dicarboxylic acid in a 1:1 ratio of dimethylformamide and methanol to form a mixture,
    adding titanium (IV) isopropoxide to the mixture to form NH2-MIL-125(Ti),
    submerging the NH2-MIL-125(Ti) in dichloromethane and,
    separating the NH2-MIL-125(Ti).

11. The method as claimed in claim 10, wherein after addition of titanium (IV) isopropoxide, a temperature of the mixture is maintained in the range of about 100° C. to about 200° C.

12. The method as claimed in claim 10, wherein after addition of titanium (IV) isopropoxide, a temperature of the mixture is maintained at about 150° C.

13. The method as claimed in claim 10, wherein the NH2-MIL-125(Ti) is activated and does not require heat activation.

14. The method as claimed in claim 10, wherein the molecules of NH2-MIL-125(Ti) are rhombic in shape.

* * * * *